ively. The rollers (at temperature of 170° C) were rotating at different speeds producing a friction of 1 : 1.2. The mixture was rolled for 5 minutes and the resulting rolled film was then pressed for 10 minutes at 190° C to form sheets 4 mm in thickness.

United States Patent [19]
Braese et al.

[11] 4,045,382
[45] Aug. 30, 1977

[54] MOLDING MATERIALS BASED ON POLYVINYL CHLORIDE AND POLYPHENYLENE OXIDE

[75] Inventors: Hans-Eberhard Braese, Cologne; Siegfried Adelmann, Krefeld; Dietrich Hardt, Cologne; Dieter Margotte, Krefeld; Hugo Vernaleken, Krefeld, all of Germany

[73] Assignee: Bayer Aktiengesellschaft, Leverkusen, Germany

[21] Appl. No.: 602,950

[22] Filed: Aug. 7, 1975

[30] Foreign Application Priority Data

Aug. 28, 1974 Germany .......................... 2441157

[51] Int. Cl.² .......................... C08L 27/06; C08L 7/00
[52] U.S. Cl. .......................... 260/4 R; 260/2.5 R; 260/42.18; 260/42.49; 260/45.7 PS; 260/876 R; 260/890; 260/891; 260/897 C
[58] Field of Search .......... 260/899, 47 ET, 876 R, 260/890, 897 C

[56] References Cited

U.S. PATENT DOCUMENTS

| | | | |
|---|---|---|---|
| 3,332,909 | 7/1967 | Farmham et al. | 260/47 |
| 3,432,468 | 3/1969 | Gabler | 260/47 |
| 3,533,978 | 10/1970 | Bullman et al. | 260/30.6 |
| 3,629,170 | 12/1971 | Yamanouchi et al. | 260/23 XA |
| 3,630,900 | 12/1971 | van der Voort | 252/47.5 |
| 3,887,647 | 6/1975 | Yonemitsu et al. | 260/876 R |

*Primary Examiner*—Carman J. Seccuro
*Attorney, Agent, or Firm*—Gene Harsh; Lawrence S. Pope; Frederick H. Colen

[57] ABSTRACT

The invention relates to thermoplastic molding materials, of high heat distortion point, comprising polyvinyl chloride or copolymers of vinyl chloride with other vinyl compounds, and polyphenylene oxides.

The molding materials according to the invention comprises a blend consisting of
 a. 30 – 90% by weight of polyvinyl chloride or of copolymers of vinyl chloride with up to about 30% by weight based on the weight of the copolymer of one or more other vinyl compounds which are copolymerizable with vinyl chloride, and
 b. about 10 – 70% by weight of a polyphenylene oxide.

Particularly preferred molding materials comprise a blend consisting of
 a. 30 – 70% by weight of polyvinyl chloride or of its copolymers with up to about 30% by weight based on the weight of the copolymer of copolymerizable vinyl compounds, and
 b. about 70 – 30% by weight of a polyphenylene oxide.

16 Claims, No Drawings

MOLDING MATERIALS BASED ON POLYVINYL CHLORIDE AND POLYPHENYLENE OXIDE

BACKGROUND OF THE INVENTION

It is known that polyvinyl chloride is one of the most important plastics and because of its mechanical properties, its chemical resistance and its flame-resistant properties, it is employed in a great variety of forms as rigid PVC or plasticized PVC. In contrast to most other industrially utilizable thermoplastics its second-order transition temperature (glass transition temperature) is about 80° C, so that the heat distortion point of rigid PVC, which when measured by the Vicat method is between 75° C and 84° C depending on the K-value and the formulation, is inadequate for many requirements and a whole range of applications remains closed to PVC. There has therefore been no lack of attempts to achieve an improvement in the heat distortion point by changing the molecular structure by copolymerization, by chemical after-treatment or by admixture of thermoplastics having a higher glass transition temperature than PVC. (G. Kuhne et al., Kunststoffe, Volume 63, (1973), pages 139–142). In particular, post-chlorination and cross-linking and copolymerization with maleimides, have given products which are technically improved and in part find limited uses in practice. The Vicat temperatures achievable by these methods (Vicat B, DIN 53 460) are about 90° C.

SUMMARY OF THE INVENTION

It has now been found that high-quality PVC molding materials with high heat distortion points, hardness and flexural strength can be produced by combining PVC (or its copolymers) with polyphenylene oxides. This combination can be produced by dissolving the two components in suitable solvents, and evaporation or precipitation. It can also be produced by mixing the individual components mechanically by known methods.

The instant invention therefore relates to molding materials comprising a blend consisting of
 a. 30 – 90% by weight of polyvinyl chloride or of copolymers of vinyl chloride with up to about 30% by weight based on the weight of the copolymer of one or more other vinyl compounds which are copolymerizable with vinyl chloride, and
 b. about 10 – 70% by weight of a polyphenylene oxide.

The instant invention relates preferably to molding materials comprising a blend consisting of
 a. 30 – 70% by weight of polyvinyl chloride or of its copolymers with up to about 30% by weight based on the weight of the copolymer of copolymerizable vinyl compounds, and
 b. about 70 – 30% by weight of a polyphenylene oxide.

At times, the toughness of the total mixture can be improved by admixture of rubber elastomers or certain rubber-modified thermoplastic resins in amounts of 5% by weight to 35% by weight based on the total mixture, whereby the advantages according to the invention are only affected to an insignificant degree.

DETAILED DESCRIPTION OF THE INVENTION

The PVC to be used according to the invention is emulsion PVC, suspension PVC or bulk-polymerized PVC. The K-values by the Fikentscher method, measured in cyclohexanone (1% strength solution at 23° C) are between about 50 and 80.

Copolymers of vinyl chloride to be used according to the invention consist of at least about 70% by weight of vinyl chloride and at most about 30% by weight of another olefinically unsaturated compound. Such olefinically unsaturated compounds suitable for copolymerization with vinyl chloride are, for example, vinylidene chloride and vinylidene fluoride, vinyl esters of $C_2$–$C_{10}$ carboxylic acids such as, for example, vinyl acetate, vinyl propionate or vinyl benzoate, acrylic acid and methacrylic acid and their alkyl esters with $C_1$ to $C_{10}$ alcohols, amides and nitriles of acrylic acid and methacrylic acid, maleic acid esters and half esters of $C_1$ to $C_{10}$ alcohols and maleimides, vinyl ethers of $C_1$ to $C_6$ aliphatic alcohols and olefinically unsaturated hydrocarbons such as ethylene, propylene or butylene.

Post-chlorinated polyvinyl chloride can also be used to make up the molding materials according to the invention.

The polyphenylene oxides used according to the present invention are those based on 2,6-dimethylphenol. They are produced in accordance with customary processes, for example by oxidatively dehydrogenating polycondensation of 2,6-dimethylphenol with oxygen in the presence of catalyst combinations of copper-(I) chloride and pyridine in organic solvents. Processes for the preparation of polyphenylene oxides are described, for example, in German Offenlegungsschrift (German Published Specification) No. 2,126,434 or in U.S. Pat. No. 3,306,875.

In general, polyphenylene oxides of which the molecular weights $\overline{MW}$ (measured by the light-scattering method) are between about 2,000 and 400,000 are employed; preferably polyphenylene oxides with molecular weights $\overline{MW}$ of between about 40,000 and 100,000 are employed.

Rubbery-elastic compounds which can optionally be used to modify the molding materials according to the invention are, in particular, natural rubber and synthetic rubber. Examples of synthetic rubber which can be used are: ethylene-propylene-diene rubber (the diene being, for example, 1,5-hexadiene), diene rubber, that is to say homopolymers of conjugated $C_4$ to $C_6$ dienes such as butadiene, isoprene and chloroprene, copolymers of such dienes with one another or copolymers of such dienes with styrene, acrylic compounds or methacrylic compounds (for example acrylonitrile, methacrylonitrile, acrylic acid, methacrylic acid, acrylic acid butyl ester and methyl methacrylate) or isobutylene. Butadiene, butadiene-styrene, butadiene-methyl methacrylate, butadiene-acrylic acid butyl ester, ethylene-propylene-diene and butadiene-acrylonitrile rubbers, which can in addition optionally contain small proportions of copolymerized polyfunctional monomers, such as divinylbenzene, are particularly preferred, as are elastomeric polyurethanes and chlorinated low pressure polyethylene containing 20–50% by weight of chlorine, and copolymers of ethylene and vinyl acetate.

Also suitable for use as impact modifiers in the composition of the present invention are rubber-modified thermoplastic resins which are defined to be resins of the acrylonitrile-butadiene-styrene (ABS), butadiene-styrene (BS) or methacrylate-butadiene-styrene (MBS) type which are prepared from butadiene or butadiene copolymers and styrene or α-methylstyrene, acrylonitrile or methacrylic acid esters by graft polymerization or combination of such graft polymers, containing rubber, with polystyrene or a styrene copolymer.

The abovementioned rubbers or rubber-modified thermoplastic resins which can be used for modifying the mixtures according to the invention are optionally employed in amounts of about 5% by weight to 35% by weight, based on the total mixture.

The molding materials according to the invention are, surprisingly, a largely compatible polymer blend. This compatibility manifests itself particularly when the two major components (a) and (b) of the mixture are conjointly dissolved in a solvent and transparent films are cast from the solution. The polymer mixtures according to the invention isolated by precipitation or evaporation can be plasticized on mills or kneaders.

The high heat distortion point of the molding materials according to the invention, which increases with the amount of polyphenylene oxide employed is an advantage of the present invention. Thus, proportions of polyphenylene oxide of, for example, 50% by weight give Vicat temperatures [according to DIN 53 460 method B] if 118° C compared to about 80° C for pure PVC.

A further advantage of the thermoplastic molding materials according to the invention is their great hardness and flexural strength and the substantially improved ease of mold release, compared to pure polyphenylene oxide. Furthermore, the thermoplastic molding materials according to the invention show good chemical resistance to acids and alkalis, and to a great variety of solvents.

The mechanical mixing of the individual components to be used according to the invention can be effected surprisingly simply by using mills, kneaders or extruders. It can be carried out at temperatures far below the melting point of the pure polyphenylene oxide component, thus, for example, a mixture of 65% by weight of PVC and 35% by weight of poly-2,6-dimethylphenylene oxide [poly-2,6-dimethylphenylene oxide $\eta$rel = 1.25 measured at 25° C in methylene chloride and at a concentration of 5 g/l, corresponding to a molecular weight $\overline{M}_w$ = 100,000] can be converted to a homogeneous melt at a temperature as low as 240° C while the polyphenylene oxide by itself can only be processed above 300° C.

According to a preferred process for the production of the molding materials according to the invention, the polyphenylene oxide is stabilized in accordance with known methods, for example by means of trinonylphenyl phosphite/cadmium sulphide, and is mixed with PVC, with addition of a customary PVC stabilizer system, after which the mixture is homogenized on mixing equipment such as mills, mixing screws or mixing extruders or internal mixers or kneaders.

Because of the requisite processing temperatures which, depending on the molecular weight and the amount of the polyphenylene oxide employed, can be between about 180 and 260° C, it is also possible to pre-stabilize the polyvinyl chloride by treating the PVC constituent, before use, by mixing it thoroughly with the amount of stabilizer required for the total system, in a high-speed mixer (at temperatures up to 150° C). Alternatively it is also possible to granulate the polyvinyl chloride employed with the stabilizer system in accordance with the methods used in PVC technology, so that a mixture of PPO and stabilized PVC granules is then used for producing the molding materials according to the invention.

The polyphenylene oxide, normally in the form of a powder or of granules, is mixed with the PVC constituents employed and this mixture is fed to the processing equipment. However, it is also possible to fuse both polymers separately, for example on extruders, and combine the melts for the final processing operation. Of course, it is also possible first separately to fuse the polyphenylene oxide or the PVC, for example on mills, and then to add the second component.

The molding materials according to the invention can also be prepared by a solution method, by dissolving the starting polymers in a solvent or solvent mixture. The polymer mixture can be isolated by conjoint precipitation of the polymers by adding a non-solvent or by adding the solution dropwise to a precipitant, or by evaporation on vacuum evaporators, rolls, evaporation screws or spray dryers.

The molding materials according to the invention can be converted to semi-finished goods or end products either by using the molding materials themselves or by using the pulverulent individual components of the molding material according to the invention; thus, polyphenylene oxide and PVC, or the conjointly precipitated mixture, can be briefly premixed at up to about 150° C in a high-speed mixer and fed to the processing equipment, for example, extruders, injection-molding machines or blow-molding installations; on the other hand, there is the possibility first to densify the molding materials according to the invention on homogenizing equipment to produce ready-to-process granules which can then be fed to the processing machinery customary in the PVC industry. It is also possible to process the molding materials by calendering, through homogenization on mills or mixing extruders and transfer of the hot plasticized material to a calender.

If it is required to improve the toughness of the molding materials according to the invention, it is possible additionally to use the rubbers or rubber-modified thermoplastics, described above and in part known from PVC technology, as so-called modifiers. These are mostly in the form of a powder or of crumbs and are introduced without special measures into the mixing process or thermoplastic homogenization process. It is however also possible to premix the PVC which is to be employed with the modifier, or subject these to a thermoplastic preliminary processing, before incorporation of the polyphenylene oxide. The same remarks apply with regard to premixing the polyphenylene oxide with the modifier.

For stabilizing the molding materials according to the invention it is possible to use the customary stabilizing systems, known from PVC technology, based on lead, barium/cadmium, calcium/zinc, organo-tin compounds on organic PVC stabilizers, individually or in combination. The requisite lubricants are also chosen from the point of view of PVC processing. Since, depending on the amount of the PPO constituent used, the processing temperatures of the molding materials are near the upper limit of tolerance of PVC, particular attention must be given to the stabilization of the PVC. In many cases, it will be necessary to increase the total stabilizer concentration compared to the stabilizer concentration customary for pure PVC.

The addition of colored pigments, fillers, glass fibers, antistatic agents, flameproofing agents and plasticizers to achieve certain properties or effects, is in principle possible. Furthermore, physical or chemical blowing agents can also be added to the molding materials according to the invention in order to achieve a foam structure under suitable processing conditions.

For the premixing process, that is to say for the homogenization of the total mixture in high-speed mixers, which is necessary prior to the plasticization of the total mixture, the requisite processing temperatures are in the range between about 20° C and 150° C. The subsequent processing of the homogenized mixture to give granules or finished articles should suitably be carried out at between about 180° C and 260° C.

The molding materials according to the invention are a category of synthetic materials which can be used in very diverse fields. Some examples are the manufacture of sheets, profiles and pipes, especially for the building industry, where the high heat resistance is of particular importance.

By using the thermoplastic molding materials according to the invention it is possible to open up new fields of use for PVC which is an economically attractive material. These include uses from which it has been excluded heretofor because of the lack of heat distortion resistance. Furthermore, the materials can be employed in the packaging field in the form of bottles, containers and films which, in contrast to PVC, can be brought into contact with hot materials to be packaged. There are a large number of possible uses, in special applications, for injection-molded articles of high heat distortion point. A further possible use of the materials is their casting or spreading from solution for the production of coatings or films.

EXAMPLES

To produce the molding materials described in the examples, a stabilized PVC mixture is first produced, which is then processed with stabilized PPO and further constituents of the mixture which are to be added, on a mill, to give a homogeneous material. The composition of the individual products is as follows:

A. PVC Powder Mixture 100 parts by weight of suspension PVC (S-PVC) of K-value 68 are mixed, with the addition of a stabilizer system consisting of 6 parts by weight of di-n-octyl-tin dithioglycollic acid ester, 1.5 parts by weight of stearic acid ester aryl ester, 1.0 part by weight of phthalic acid distearyl ester, 0.3 part by weight of montan-acid ester and 0.2 part by weight of polyethylene wax for 5 minutes in a high-speed mixer at 2,000 revolutions per minute, during which mixing the temperature rises to 120° C. Thereafter, the mixture is cooled to room temperature at a reduced speed (about 500 rpm).

It is also possible to homogenize the constituents of the mixture on a mill or on a mixing extruder and then to produce granules therefrom. The following mechanical properties were measured on this PVC component:

| Ball indentation hardness | DIN 53 456 | MPa | 131.7 |
|---|---|---|---|
| Impact strength | DIN 53 453 | kJ/m² | |
| | | RT | 10 specimens not broken |
| | | −20° C | 3 out of 10 broken |
| | | −40° C | 42 |
| Notched Impact strength | DIN 53 453 | kJ/m² | |
| | | RT | 2 |
| Vicat | DIN 53 460 method B | ° C (49.05 N) | 74 |
| Bending stress | DIN 53 452 | MPa | 95.0 |
| Deflection, mm | | | 3.8 |
| Tensile strength | DIN 53 455 | MPa | 65.3 |
| Elongation | DIN 53 455 | % | 4 |

B. Polyphenylene oxide

The polyphenylene oxide used according to the present invention was prepared as follows:

8 kg of 2,6-dimethylphenol were dissolved in a solution of 30 l of n-butanol, 10 l of toluene, 4 kg of pyridine and 100 g of copper-I chloride. 2,6-dimethylphenyl is condensed by oxidative dehydrogenation to poly-(2,6-dimethyl-1,4-phenylene oxide) over the course of 6 hours by supplying 50 l of oxygen/minute. When the introduction of oxygen is started, the temperature rises markedly. A temperature rise above 55° C is prevented by cooling during the first stage of the reaction. After 2 to 3 hours, the polyphenylene oxide begins to precipitate. After continuing to supply oxygen for about 3 hours, the PPO is filtered off, washed with methanol containing hydrochloric acid until free from pyridine and reprecipitated from chloroform/methanol. A pale yellow-colored powder is obtained. The viscosity $\eta_{rel}$ is 1.25 ($\eta_{rel}$ measured at 25° C methylene chloride at a concentration of 5 g/l) and the molecular weight $\overline{M}w$ is about 100,000. (Compare German Offenlegungsschrift (German Published Specification) No. 2,126,434)

The material is stabilized according to known methods by means by means of 3 parts by weight of trinonylphenyl phosphite and 0.5 part by weight of cadmium sulphide. (Compare German Offenlegungsschrift (German Published Specification No. 2,120,154)

C. ABS

This is a graft polymer of 50 parts by weight of polybutadiene, 36 parts by weight of polymerized styrene and 14 parts by weight of polymerized acrylonitrile.

EXAMPLE 1

80 parts by weight of the PVC compound A are premixed with 20 parts by weight of PPO B. for 1 minute in a high-speed mixer at about 1,500 rpm and the mixture is then homogenized on a laboratory mill for a total of 5 minutes. The mill temperature is 250° C; a coherent hide is produced. This is then prewarmed in a high-pressure press at 230° C for 3 minutes without applying pressure after which it is pressed for a further 3 minutes under pressure to give a sheet which is used for producing the test specimens. Their mechanical data are shown in Table 1.

EXAMPLES 2-4

PVC compound A. and the polyphenylene oxide B. are mixed as follows, using the procedure of Example 1:
2. 65 parts by weight of A + 35 parts by weight of B.
3. 50 parts by weight of A + 50 parts by weight of B.
4. 35 parts by weight of A + 65 parts by weight of B.

The molding materials produced are distinguished by great hardness, high bending stress and high dimensional stability. The mechanical data are to be found in Table 1.

EXAMPLE 5

35 parts by weight of the polyphenylene oxide B and 65 parts by weight of S-PVC of K-value 68 are dissolved in cyclohexanone at 60° C while stirring. When the product has dissolved, the polymer mixture is precipitated by pouring the solution into methanol. The finely divided polymer is dried for 20 hours at 60° C and 5 hours at 80° C in vacuo.

For processing, 100 parts by weight of the precipitated polymer mixture are mixed, in a high-speed mixer according to Example 1, with the stabilizer and lubricant system described in Example A and the mixture is homogenized on a mill at 240° C for 5 minutes. The mill hide obtained is processed as described to give pressed sheets of which the mechanical data are shown in Table 1.

EXAMPLE 6

A mixture of 50 parts by weight of the polyphenylene oxide B. and 50 parts by weight of S-PVC is prepared in accordance with the method described in Example 5 and processed to give pressed sheets. The mechanical data are to be found in Table 1.

EXAMPLE 7

To produce molding materials which have been given a high impact resistance or notched impact resistance by addition of ABS, the procedure described in Example 1 is followed, with addition of the pulverulent product described under C. The following mixing ratio is chosen: 30 parts by weight of A + 50 parts by weight of B + 20 parts by weight of C.

In addition to the great hardness and high flexural strength and heat distortion point already described, the molding materials produced also display improved toughness. The mechanical data are to be found in Table 1.

What is claimed is:

1. A thermoplastic molding composition consisting of a blend of
   a. 30–90% by weight of polyvinyl chloride or of copolymers of vinyl chloride with up to 30% by weight based on the weight of the copolymer of one or more other copolymerizable vinyl compounds, and
   b. about 10–70% by weight of a polyphenylene oxide based on 2,6-dimethylphenol having a molecular weight, $\overline{M}_w$, of between about 40,000 and 100,000.

2. A thermoplastic molding composition consisting of a blend of
   a. 30–90% by weight of polyvinyl chloride or of copolymers of vinyl chloride with up to 30% by weight based on the weight of the copolymer of one or more other copolymerizable vinyl compounds,
   b. about 10–70% by weight of a polyphenylene oxide based on 2,6-dimethylphenol having a molecular weight, $\overline{M}_w$, of between about 40,000 and 100,000, and
   c. an impact modifier selected from the group consisting of natural rubber, synthetic rubber and rubber modified thermoplastic resins.

3. A thermoplastic molding composition consisting of a blend consisting of
   a. 30–90% by weight of polyvinyl chloride or of copolymers of vinyl chloride with up to 30% by weight based on the weight of the copolymer of one or more other copolymerizable vinyl compounds, and
   b. about 10 – 70% by weight of a polyphenylene oxide based on 2,6-dimethylphenol having a molecular weight, $\overline{M}_w$, of between about 40,000 and 100,000
   and additives selected from the group consisting of pigments, fillers, glass fibers, antistatic agents, flameproofing agents, blowing agents and stabilizers.

4. A composition according to claim 3 consisting of a blend consisting of
   a. 30–70% by weight of polyvinyl chloride or of copolymers of vinyl chloride with up to 30% by weight based on the weight of the copolymer of one or more other copolymerizable vinyl compounds and,
   b. 30–70% by weight of polyphenylene oxide based on 2,6-dimethylphenol having a molecular weight, $\overline{M}_w$, of between about 40,000 and 100,000
   and additives selected from the group consisting of pigments, fillers, glass fibers, antistatic agents, flameproofing agents, blowing agents and stabilizers.

TABLE 1

| Properties | Test Method | Unit of Measurement | EXAMPLES 1 | 2 | 3 | 4 | 5 | 6 | 7 |
|---|---|---|---|---|---|---|---|---|---|
| Ball indentation hardness, 30" | DIN 53 456 | MPa | 145.3 | 153.8 | 154.3 | 163.5 | 154.9 | 157.2 | 121.0 |
| Impact strength, + 23° C | DIN 53 453 | kJ/m² | 12 | 10 | 8 | 8 | 10 | 11 | 22 |
| Notched impact strength + 23° C | DIN 53 453 | kJ/m² | 3 | 3 | 3 | 3 | 4 | 3 | 8 |
| Vicat heat distortion point, method B | DIN 53 460 | ° C | 89 | 107 | 118 | 130 | 108 | 117 | 116 |
| Bending stress σ bF | DIN 53 452 | MPa | 88.0 | 95.6 | 101.2 | 108.0 | 99.7 | 94.2 | 83.3 |
| Deflection fB | | mm | 3.7 | 3.8 | 3.4 | 2.8 | 3.5 | 3.5 | 3.5 |
| Tensile strength σ B | DIN 53 455 | MPa | 59.3 | 53.1 | 52.1 | 49.3 | 52.6 | 51.7 | 49.8 |
| Elongation ε R | | % | 2 | 2 | 2 | 2 | 3 | 2 | 2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

5. The composition according to claim 3 wherein the polyvinyl chloride component comprises PVC homopolymers having K-values of about 50–80.

6. The composition according to claim 3 wherein the polyphenylene oxide component comprises poly-(2,6-dimethyl-1,4-phenylene oxide) having molecular weights, $\overline{M}_w$ of about 40,000 to 100,000.

7. The composition according to claim 3 wherein the copolymer of vinyl chloride comprises at least about 70% by weight of vinyl chloride and up to about 30% by weight of another olefinically unsaturated compound.

8. The composition according to claim 14 wherein about 5–35% by weight, based on the total composition of said impact modifier is present.

9. The composition according to claim 8 wherein the impact modifier is selected from the group consisting of rubbers of butadiene, butadiene-methyl methacrylate, budadiene acrylic acid, butyl ester, ethylene-propylene-diene, butadiene acrylonitrile, butadiene styrene and elastomeric polyurethanes, chlorinated low pressure polyethylene containing 20 to 50% by weight chlorine and copolymers of ethylene and vinyl acetate.

10. A molded article made from the composition of claim 3.

11. A process for improving the heat distortion properties of polyvinyl chloride consisting of mixing it with 10 to 70 wt. % of polyphenylene oxide based on 2,6-dimethylphenol having a molecular weight, $\overline{M}_w$, of between about 40,000 and 100,000 and with additives selected from the group consisting of pigments, fillers, glass fibers, antistatic agents, flameproofing agents, blowing agents and stabilizers.

12. The process of claim 11 wherein the polyphenylene oxide is mixed with the polyvinyl chloride in mechanical mixing equipment at temperatures of about 180° to 260° C.

13. The process of claim 11 wherein the polyvinyl chloride is stabilized before it is mixed with the polyphenylene oxide.

14. The process of claim 11 wherein the polyvinyl chloride and the polyphenylene oxide are mixed by dissolving them in a common solvent or solvent system and isolating them by conjoint precipitation or by evaporation of the solvent.

15. A thermoplastic molding composition consisting of a blend consisting of
   a. 70–30% by weight of a polyvinyl chloride homopolymer with a K-value of about 50 to 80, with
   b. about 30 to 70% by weight of poly(2,6-dimethyl-1,4-phenylene oxide) having a molecular weight, $\overline{M}_w$ of about 40,000 to 100,000 and additives selected from the group consisting of pigments, fillers, glass fibers, antistatic agents, flameproofing agents, blowing agents and stabilizers which is produced by either dissolution in and isolation from a common solvent or solvent system or mechanical mixing at temperatures between about 180 to 260° C.

16. A thermoplastic molding composition consisting of a blend consisting of
   a. 30–90% by weight of polyvinyl chloride or of copolymers of vinyl chloride with up to 30% by weight based on the weight of the copolymer of one or more other copolymerizable vinyl compounds,
   b. about 10–70% by weight of a polyphenylene oxide based on 2,6-dimethylphenol having a molecular weight, $\overline{M}_w$, of between about 40,000 and 100,000, and
   c. an impact modifier selected from the group consisting of natural rubber, synthetic rubber and rubber modified thermoplastic resins and additives selected from the group consisting of pigments, fillers, glass fibers, antistatic agents, flameproofing agents, blowing agents and stabilizers.

* * * * *